Feb. 12, 1946. W. P. LITTLE 2,394,923
DUST COLLECTOR
Filed Nov. 3, 1943 2 Sheets-Sheet 2

Inventor
William P. Little
By Wooster & Davis
Attorneys

Patented Feb. 12, 1946

2,394,923

UNITED STATES PATENT OFFICE 2,394,923

DUST COLLECTOR

William P. Little, Stratford, Conn.

Application November 3, 1943, Serial No. 508,794

9 Claims. (Cl. 183—37)

This invention relates to a fuel saver dust collector, particularly to a device for filtering or cleaning dust laden air from industrial processes, such for example as the air from grinders, polishers or other devices, and has for an object to provide an improved construction and arrangement whereby the dust laden air from the grinders or other machines or devices will be thoroughly and effectively cleaned and may be discharged back into the room in which the machines are located so as to conserve the heat in the air normally lost in dust collecting systems and save fuel, and to discharge the air into the room in such a manner that it will be highly diffused so as not to create any appreciable draft or discomfort.

It is also an object of the invention to provide an improved construction and arrangement for such a device in which the heavy particles of dust or dirt are first removed from the air by centrifugal action and action of gravity and the remaining fine dust particles are removed by an effective filtering means of large filtering surface and capacity, and is so arranged that the fan means causing the circulation of the air through the device is on the outlet side of the filter so that only cleaned air passes into the fan and there is no accumulation of dust or dirt in the fan to affect its efficiency or cause wear or deterioration.

Another object is to provide a construction which will be compact and require a minimum of space for effective and efficient operation, and one which is of very simple construction and may be manufactured and sold at relatively low cost.

Another object is to provide a construction of this type which may be readily cleaned and from which any accumulation of dust and dirt particles may be readily removed.

With the foregoing and other objects in view I have devised the construction illustrated in the accompanying drawings forming a part of this specification. It is, however, to be understood the invention is not limited to the specific details of construction and arrangement shown but may embody various changes and modifications within the scope of the invention.

Figure 1:
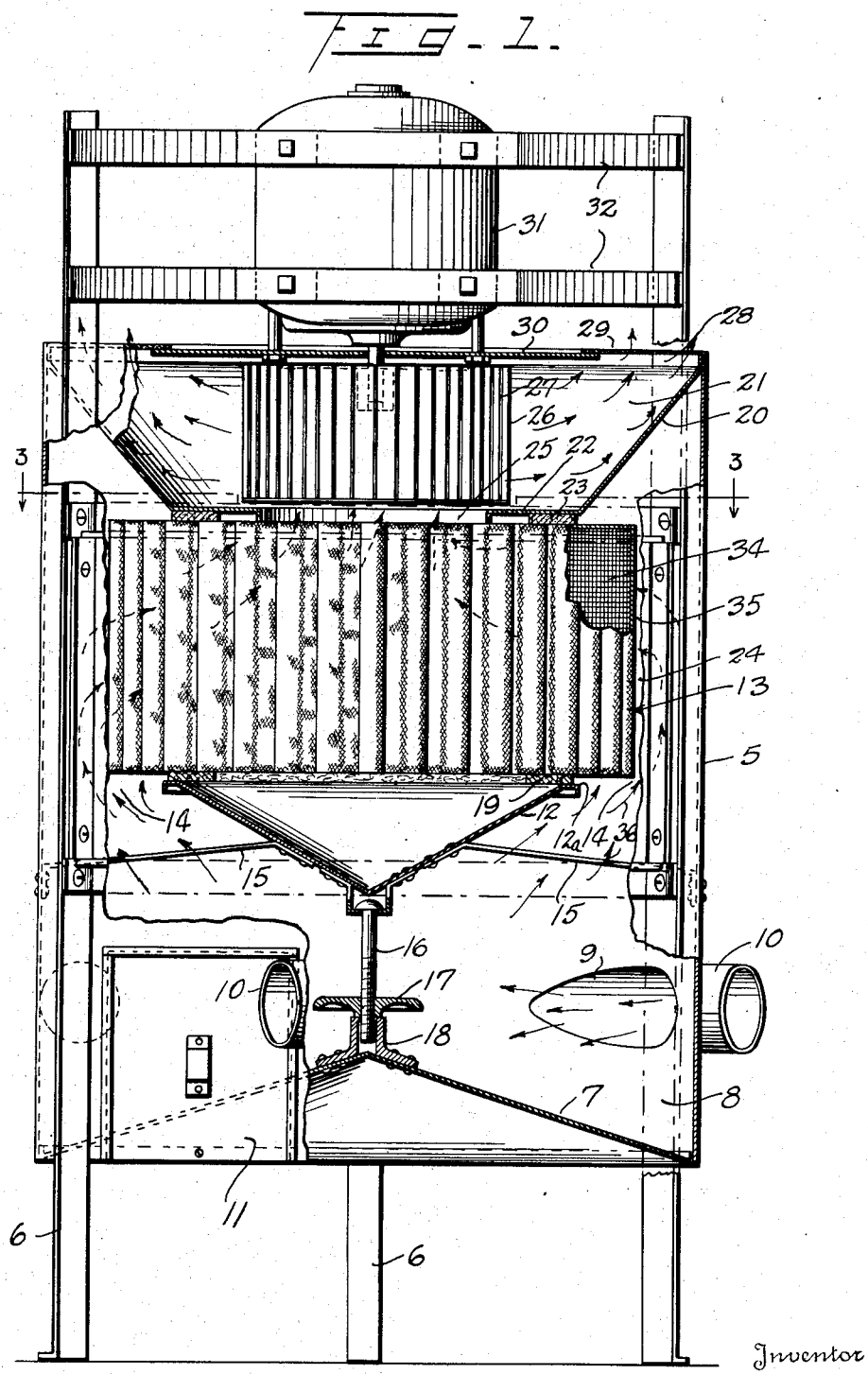
Fig. 1 is a partial vertical section and partial side elevation of the device with parts broken away to more clearly show the construction.
Figure 2:
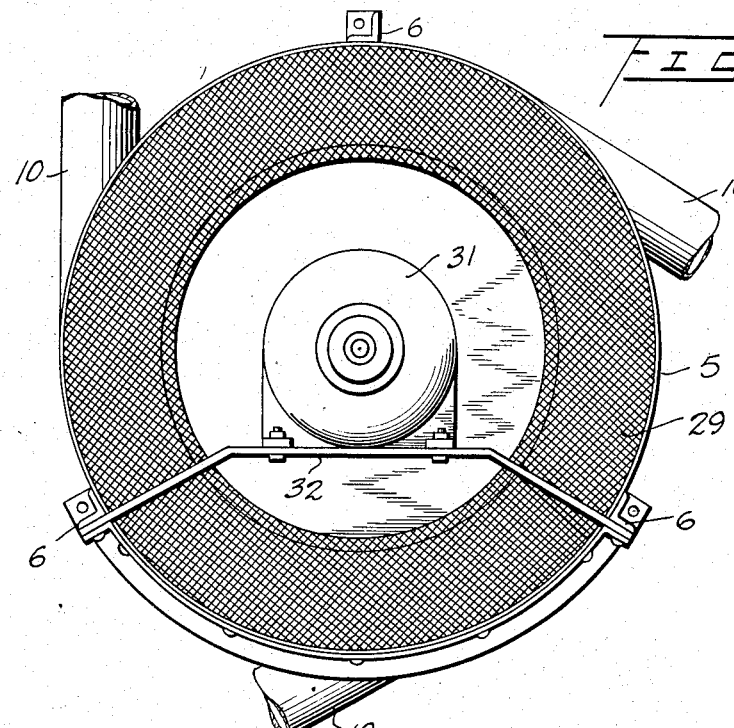
Fig. 2 is a top plan view thereof.
Figure 3:
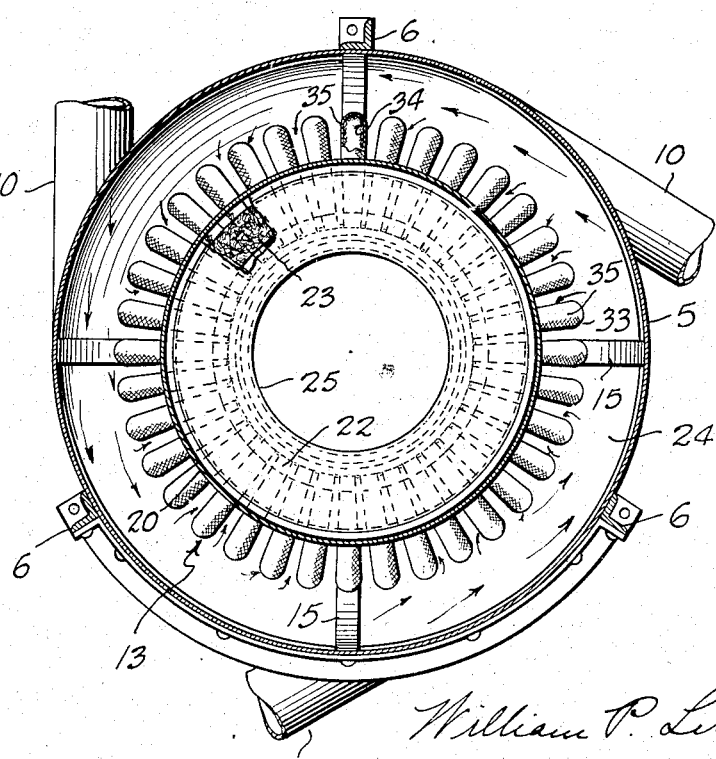
Fig. 3 is a transverse section substantially on the line 3—3 of Fig. 1.

The device as illustrated comprises an upright substantially cylindrical sheet metal housing or casing 5 which may be supported by any suitable means such for example as the angle iron frame members 6. The lower end of this casing is closed by a bottom diffusing cone 7 above which is a diffusing and centrifugal separating chamber 8. Leading through the side walls of the casing to this chamber are one or more air inlets 9 for the dust laden air to be cleaned, these inlets being connected with suitable conduits 10 leading from the source of the dust laden air, such for example as a grinding machine or other devices. As indicated, it is preferred this dust laden air be discharged into the chamber 8 tangentially thereof so as to whirl around the chamber so that centrifugal action will throw out the heavier dust particles and also the slowing up of the velocity of the air because of the larger space or capacity of this chamber will cause these particles to drop or be thrown down through the action of gravity and accumulate on the cone 7 from which they may be removed through the cleanout door 11.

Spaced above the cone 7 is an inverted cone 12 which forms a baffle means to project the air flowing upwardly from the chamber 8 outwardly toward the walls of the casing, and also forms a support for the filter 13. The cone 12 is of less diameter than the casing 5 so that its periphery is spaced inwardly from the walls of the casing forming an annular passage 14 for flow of air from the chamber 8 into the space between the filter 13 and the casing and also into the filter. The cone 12 may be supported by any suitable means such as the radial supports or braces 15 and there is also a clamping means supporting this cone on the cone 7 comprising a bolt 16 connected to the under side of the cone 12 and supported by a hand wheel 17 threaded on the bolt and resting on a support 18 carried by the cone 7. The filter 13 is supported on the cone 12 and there is provided a felt sealing ring 19 between the filter and the cone to make an air and dust tight connection.

Mounted above the filter 13 is a truncated inverted cone 20 forming a fan housing and also a diffusing cone or housing about the fan and preferably spaced from it so as to provide a diffusing chamber 21. The lower end portion of the cone 30 is extended inwardly to form an annular flat wall 22 at the top of the filter 13 and between which and the filter is a felt sealing ring 23 similar to the ring 19 to make a dust and air tight connection. It will be seen the inclined portion of the cone 20 extends from the filter to the casing 5 over the annular passage 24 between the filter and the casing to close off the upper part of this passage so that the air flowing into it from the diffusing and centrifugal chamber 8 must pass into and through the filter.

Any desired type of filter may be employed but I prefer substantially the type shown in the drawings as it has a large filter surface and cleaning capacity and also may be readily removed for cleaning or repair. It is of generally cylindrical shape and hollow, the air passing from the outside into the center thereof and then through the central opening 25 in the plate 22 into the rotor 26 of the fan located in the diffusing chamber 21. Any suitable type of fan may be used but I prefer to use a squirrel-cage type of fan or rotor comprising upright spaced slats 27 which throws or discharges the air laterally in all directions through the spaces between the slats so that it is discharged laterally to the diffusing chamber 21 toward the inclined wall 20 and is deflected by this wall upwardly through the free discharge outlet. With this arrangement there is no closed casing around the rotor or blades of the fan and thus the air is diffused throughout the relatively large space of chamber 21 and flows out through the discharge or exhaust opening 28 which extends throughout the periphery of the casing and is of sufficient width to provide an exhaust opening of large area so that the cleaned air as it leaves the device is highly diffused and moving at a low velocity and will be distributed throughout the room so as not to create any appreciable draft. This discharge may be covered by suitable guard means such for example as the expanded metal guard 29 extending between the casing 5 and the top central baffle plate 30 located over the top of the rotor 26 of the fan. The fan rotor is operated by any suitable means such as the electric motor 31 mounted in the supporting frame by any suitable means such as the frame members 32.

As above indicated, although the filter 13 is of a substantially cylindrical hollow structure it has a very extensive cleaning or filtering surface. This is secured by a plurality of radially arranged upright spaced leaf members 33 each of which is hollow and is formed by an inner supporting member 34 of fine woven wire mesh folded to substantially U-shape which forms a support for a fabric filter covering 35. The wire mesh not only supports the fabric filter covering but may also itself be a filtering means and may in some circumstances be used without the cloth covering. This type of filter can be purchased on the market as a unit fully assembled and may be mounted in this device through a door opening in the side of the casing 5. This is accomplished by first lowering the cone 12 through operation of the hand wheel 17, inserting the filter in place on top of the cone 12, and then by rotating the hand wheel 17 the cone and filter may be raised and clamped between the walls 22 and the flat peripheral portion 12a of the cone and against the felt sealing rings 19 and 23 which make an air tight connection and insure that the air flows through the filter.

It will be seen that the air is drawn through the filter to the interior thereof and out the central opening 25 by means of the fan 26. This causes circulation of air through the entire device from the inlet conduits 10 to the free discharge outlet 28. This dust laden air enters through the pipes 10 tangentially of the casing 5 so that this air enters above the cone 7 and swirls around the chamber 8 in the lower part of the casing. This action is assisted by the diffusing cone 7. The centrifugal effect together with gravity acting as the air velocity decreases throws down the larger or heavier particles to the lower part of the chamber and on the cone 7 where they collect at the lower part thereof and may be removed through the cleanout door 11. The air with the finer particles not removed by the centrifugal action and the action of gravity passes upwardly through the annular passage 14 between the upper rim of the cone 12 and the casing, as indicated by the arrows 36, and then passes inwardly through the cloth folds and wire mesh of the filter 13 and into the hollow center thereof. This removes or filters out all the remaining fine particles of dust and the completely cleaned air passes through the central opening 25 in the wall 22 into the open center of the squirrel cage rotor 26 by which it is thrown outwardly above the fan housing or diffusing cone 20 and passes through the open grid 29 into the room.

It is to be noted that first the heavy particles are removed by centrifugal action and gravity so that the filter has to remove only the fine particles. It is also to be noted that the fan is on the outlet side of the filter so that it handles only cleaned air, and dust particles do not go into the fan to wear it out and clog it up. Still further, in the preferred construction as illustrated, there is no close casing or housing as is usual around the discharge periphery of the fan, but the whole periphery of the fan is open and unenclosed so that the air is discharged in all directions and passes into the room throughout the entire periphery of the top of the casing through the guard 29. The air thus passes out at a low velocity and highly diffused so as not to create any appreciable draft. This is the preferred construction and arrangement, but it is to be understood the invention is not limited to this type of fan or to this specific type of discharge. As with this device the air may be discharged back into the room from which it is taken there is no loss of heat and there may be a great saving of fuel effected. It also keeps the air in the room circulating, thus tending to maintain more comfortable conditions. The device can be built in comparatively small units and the entire system can be readily moved to take care of changing conditions in a factory. Although the device is shown with the centrifugal chamber 8 at the bottom of the casing and the fan at the top, this can be reversed with the chamber at the top and the fan at the bottom.

Having thus set forth the nature of my invention, what I claim is:

1. In a dust collector and separator, an upright casing, a bottom diffusing cone and an inverted cone of less diameter than the casing spaced above the first cone forming a centrifugal separating chamber, a tangential inlet for dust laden air to said chamber, a hollow filter located above the second cone to receive the air passing upwardly around the periphery of this cone, an inverted cone above the filter forming a diffusing chamber open through its top wall for discharge of air, and a fan located in this latter chamber with its inlet connected with the outlet of the filter and discharging laterally into said diffusing chamber.

2. In a dust collector and separator, an upright substantially cylindrical casing, a centrifugal separating chamber at the lower part of the casing, means for discharging dust laden air tangentially into said chamber, an upright hollow filter located above said chamber and of less diameter than the casing to form a surrounding passage to permit the air from the chamber to flow laterally into the periphery of the filter, a diffusing chamber above the filter having a free discharge therefrom, an outwardly and upwardly inclined wall forming the side walls of the diffusing chamber and a closing top wall for said passage, and a fan located in the latter chamber arranged with its inlet connected with the interior of the filter and discharging laterally into said chamber toward said side walls.

3. In a dust collector and separator, an upright substantially cylindrical casing, a lower diffusing cone in the casing, an inverted cone above the first cone and forming therewith a centrifugal diffusing chamber, means for discharging dust laden air tangentially into said chamber, said upper cone being of less diameter than the casing to form an annular discharge passage from the chamber, an upright hollow filter of less diameter than the casing mounted above the second cone, a second inverted cone located above the filter to close the top of the space between the filter and the casing and forming a diffusing chamber above it with a free discharge from the casing, and a fan located in said latter chamber above the filter with its inlet connected with the interior of the filter and discharging laterally into said chamber.

4. In a dust collector and separator, an upright substantially cylindrical casing, a centrifugal separating chamber at the lower part of said casing, means for discharging dust laden air into said chamber, an inverted cone forming the top of said chamber and of less diameter than the casing to form an annular discharge passage from the chamber about the cone, an upright hollow filter above said cone, an inverted cone shaped annular wall in the upper part of the housing above the filter forming a diffusing chamber having a free discharge through the top of the casing, and a fan including an upright rotor in said chamber arranged to receive air from the filter and discharge it laterally in said chamber toward said wall to be diffused and deflected by this wall toward the discharge.

5. In a dust collector and separator, an upright substantially cylindrical casing, a centrifugal separating chamber at the lower part of said casing, means for discharging dust laden air into said chamber, a baffle of less diameter than the casing forming the top wall of said chamber, an upright generally cylindrical hollow filter of less diameter than the casing mounted above the baffle so that air passing from the chamber around the baffle enters the space between the filter and the casing, an inverted cone shaped annular wall extending between the filter and the casing at the top of said space and forming a diffusing chamber having a free discharge through the top of the casing, and a fan including an upright rotor in said latter chamber arranged to draw air from the interior of the filter and discharge it laterally into the diffusing chamber toward said wall.

6. In a dust collector and separator, an upright substantially cylindrical casing, a centrifugal separating chamber at the lower part of said casing, means for discharging dust laden air into said chamber, an inverted cone spaced above the bottom wall of said chamber and of less diameter than the casing to provide an annular discharge passage from said chamber, a filter mounted on said cone, a downwardly and inwardly tapered annular wall in the upper part of the casing over said filter forming a diffusing chamber having a free discharge therefrom, clamping means below the cone to clamp the filter between the cone and said annular wall, and a fan in said latter chamber arranged to draw air through the filter and discharge it laterally into said chamber.

7. In a dust collector and separator, an upright substantially cylindrical casing, a centrifugal separating chamber at the lower part of said casing, means for discharging dust laden air into said chamber, an inverted cone forming the top of said chamber, an upright generally cylindrical filter mounted above said cone and of less diameter than the casing, an inverted cone shaped annular wall above the filter over and closing the upper part of the space between the filter and the casing forming a diffusing chamber above it having a free discharge through the top of the casing, and means for causing flow of air from the lower chamber through the filter to the diffusing chamber and directing it in said chamber toward said annular wall.

8. In a dust collector and separator, an upright substantially cylindrical casing, a centrifugal separating chamber at the lower part of said casing, means for discharging dust laden air into said chamber, an inverted cone forming the top of said chamber and of less diameter than the casing to form an annular outlet from the chamber, a generally cylindrical hollow filter mounted on said cone and of less diameter than the casing to provide an annular space to receive the air from said outlet, an inverted cone shaped annular wall above the filter extending over and closing the space between the filter and the casing and forming a diffusing chamber above it receiving air from the filter and having a free discharge through the top of the casing, and means below the cone acting to press it against the filter for clamping the filter between the cone and the annular wall.

9. In a dust collector and separator, an upright substantially cylindrical casing, a centrifugal separating chamber at the lower part of said casing, an inlet for dust laden air to said chamber discharging tangentially thereof, an inverted cone forming the top of said chamber and of less diameter than the casing to provide an annular discharge passage from the chamber, an upright generally cylindrical hollow filter mounted above the cone and of less diameter than the casing to provide a space to receive the air from said passage, an inverted cone shaped annular wall above the filter extending from the filter to the casing over said space to close the upper end thereof and forming a diffusing chamber above it having a free discharge from the casing and communicating with the interior of the filter at the center of said wall, and means for causing flow of air from the lower chamber through the filter to the diffusing chamber and directing it toward said annular wall.

WILLIAM P. LITTLE.